No. 832,103. PATENTED OCT. 2, 1906.
W. I. TWOMBLY.
SHOCK ABSORBER.
APPLICATION FILED NOV. 9, 1905.
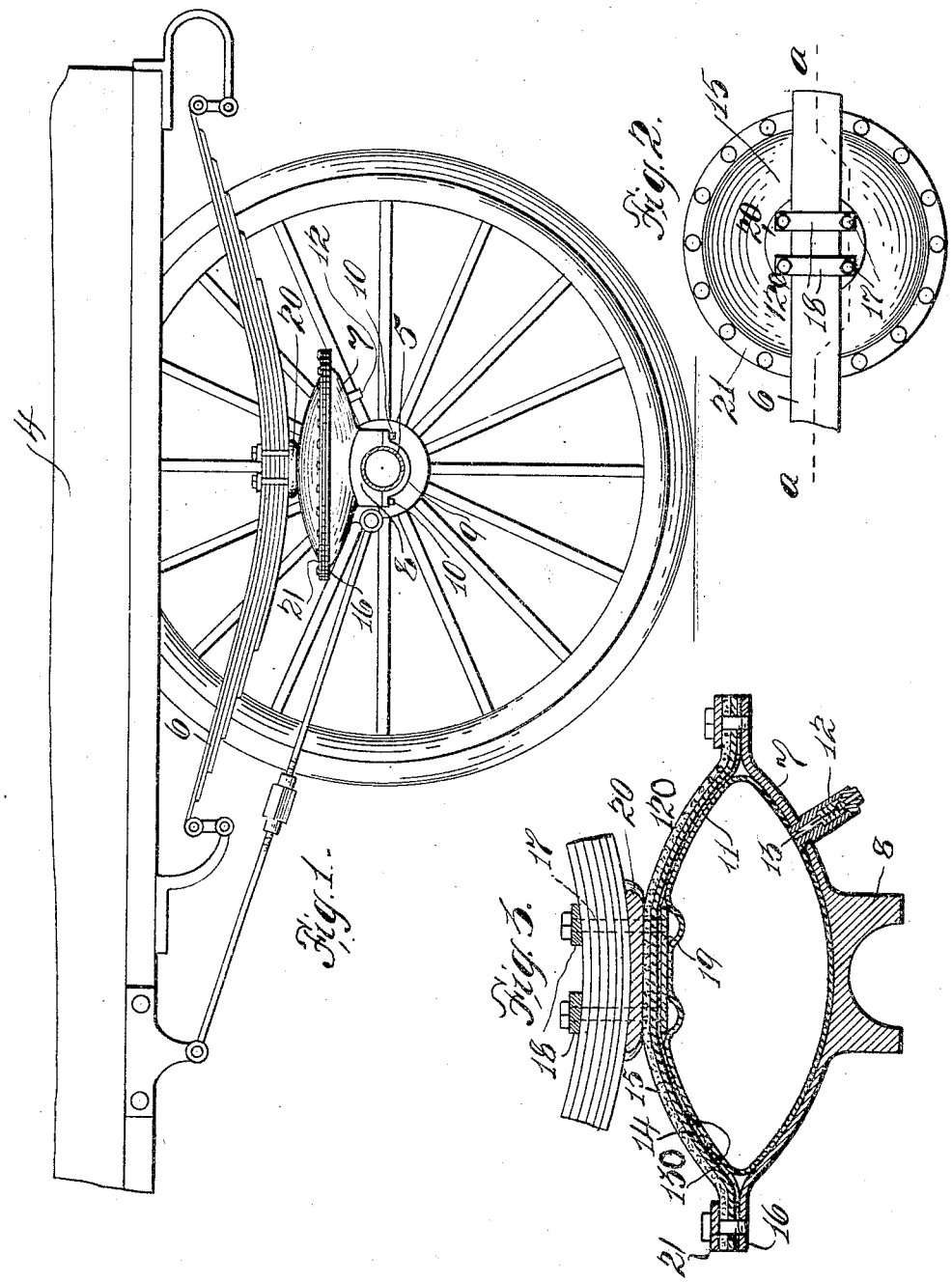
Witnesses:
E. A. Jarvis
J. Barnado
Inventor
Willard Irving Twombly
By his Attorney

UNITED STATES PATENT OFFICE.

WILLARD IRVING TWOMBLY, OF NEW YORK, N. Y.

SHOCK-ABSORBER.

No. 832,103.

Specification of Letters Patent.

Patented Oct. 2, 1906.

Application filed November 9, 1905. Serial No. 286,462.

*To all whom it may concern:*

Be it known that I, WILLARD IRVING TWOMBLY, a citizen of the United States, residing at New York, in the county of New York and State of New York, have invented new and useful Improvements in Shock-Absorbers, of which the following is a specification.

The invention has reference to means the interposition of which between the body and axles of vehicles will create for the former a cushion-field upon which said body may rock or ride with that degree of universality which will render the cushion-field equally as effective whatever be the relations of the body and axles.

It is an object of the invention to provide a cushion of a pneumatic type which shall be hermetically sealed within an element and to suitably dispose such element or a number of them preferably intermediate of and relatively to the body and a portion of the running-gear of a vehicle—such, for instance, as the axle.

Another object of the invention is to provide a fluid-cushion which will be responsive to all lines of thrust and whose behavior will be the same irrespective of these lines.

I fully understand the general applicability of the invention for various purposes to which such invention might relate, and I would regard it as an infringement of my rights in the premises if any one should interpose between the running-gear and the body of a vehicle any fluid-containing device for service as a cushion between the two, provided the portions of the body and running-gear are secured or otherwise arranged on the outer portions of the element within which the fluid is confined in the manner herein claimed.

I have illustrated an embodiment of the invention on the accompanying sheet of drawings as applied to a vehicle.

In said drawings, Figure 1 illustrates a portion of a vehicle running-gear, body, and the feature of invention in side elevation. Fig. 2 illustrates a top plan view of a form of cushion, and Fig. 3 illustrates an elevational view in section of the same.

In the several illustrations similar characters of reference indicate similar parts on the drawings.

The mode of locating the cushion-field may be of the most expedient character considering the environment. It may be either located between the body 4 and the axle 5, between the springs 6, supporting the body 4, and the axle 5, or in any other suitable manner. This cushion may be formed in any suitable manner and is here illustrated as comprising a frame 7, which may be provided with a bearing 8, which can be secured to the axle 5 by a strap 9 in any suitable manner, as by bolts 10. Within this frame may rest an inflatable bladder 11, made of any suitable material, such as rubber, and which may be provided with an inlet-valve 12, which in the present instance passes through an opening 13 in said frame 7 whereby the bladder may be emptied or inflated at will. This bladder 11 in the present instance is covered with flexible material 120—such as a composite layer of fabric 130, rubber 14, and hide or other suitable material 15, superposed, preferably, in the order of their mention—and this cover 120 may be secured to the frame 7 in any suitable manner—such, for instance, as by bolting the same through a ring 21 to a flange 16, which may be formed on the frame. If it is designed that this cushion shall be interposed between the axle 5 and the spring 6, said springs may be secured to the cover 120 in any suitable manner—for instance, by securing the same to the cover by bolts 17, which may pass through said cover, straps 18, located over the top of the springs, and a plate 19, located on the under side of the cover 120.

For shielding the cover 120 against any action the springs 6 may have thereupon there may be provided a plate 20, interposed between the spring 6 and the cover 120, and this plate may be held in place by the bolts 17 aforementioned. It may be said that, if desired, the bladder 11 may be omitted, and the cover may be made of an impervious material and so distended by inflation that it may serve to buoy the member it shall support. It will be noted in this connection that the cover 120 offers an extended field over which the member supported thereon may roll or move, thereby giving a universal cushion effect for any line of thrust.

It will now be noted that I have provided a device comprehending an inflated member which shall be disposed intermediate of two bodies, one portion of which is flexible and serves to offer a flexible field for universal rocking movement of a member riding thereon; further, that the fluid therein contained is hermetically contained, and therefore offers at all times a positive and equally responsive cushion.

Having thus described this invention, I claim—

1. In a device of the character specified, the combination with a rigid frame, of a cover therefor, and which is secured to said frame, around the edges thereof; said cover and frame forming a fluid-chamber, and said cover providing a flexible field upon which a body portion of a vehicle may have a universal rocking movement.

2. In a device of the character specified, the combination with a rigid frame, of a cover therefor, and which is secured to said frame, around the edges thereof; said cover and frame forming a fluid-chamber, and said cover providing a flexible field upon which a portion attachable to the body portion of a vehicle may have a universal rocking movement, and means whereby fluid may be introduced into said fluid-chamber.

3. In a device of the character specified, the combination with a rigid frame, of a cover therefor, and which is secured to said frame, around the edges thereof; said cover and frame forming a fluid-chamber, a fluid-bladder in said chamber, and which supports said cover, the latter, in conjunction with the bladder, providing a flexible field upon which a body portion of a vehicle may have a universal rocking movement.

4. In a device of the character specified, the combination with a rigid frame, of a cover therefor, and which is secured to said frame, around the edges thereof; said cover and frame forming a fluid-chamber, a fluid-bladder in said chamber, and which supports said cover, the latter, in conjunction with the bladder, providing a flexible field upon which a body portion of a vehicle may have universal rocking movement, and means whereby fluid may be introduced into said fluid-bladder.

5. In a device of the character specified, the combination with a rigid frame, of a cover therefor, and which is secured to and around the edges of said frame, said cover comprising a laminated fabric; said cover and frame forming a fluid-chamber, and said cover providing a flexible field upon which a body portion of a vehicle may have a universal rocking movement.

6. In a device of the character specified, the combination with a rigid frame, of a cover therefor, and which is secured to and around the edges of said frame, said cover comprising a laminated fabric; a fluid-bladder inclosed between said frame and cover, the latter, together with said bladder, forming a flexible field, upon which a body portion of a vehicle may have a universal rocking movement.

7. In a device of the character specified, the combination with a rigid frame, of a cover therefor, and which is secured to and around the edges of said frame, said cover comprising a laminated fabric; a fluid-bladder inclosed between said frame and cover, the latter, together with said bladder, forming a flexible field, upon which a body portion of a vehicle may have a universal rocking movement, and means whereby fluid may be introduced into said fluid-bladder.

Signed at New York, in the county of New York and State of New York, this 8th day of November, 1905.

WILLARD IRVING TWOMBLY.

Witnesses:
EMIL L. AARON,
FRED. W. BARNACLO.